United States Patent
Petreycik

[15] 3,677,130
[45] July 18, 1972

[54] CHORD TEACHING DEVICE

[72] Inventor: Michael G. Petreycik, 510 Lake Ave, Bridgeport, Conn. 06605

[22] Filed: June 9, 1971

[21] Appl. No.: 151,178

[52] U.S. Cl. ................................84/471, 84/477 R, 84/485
[51] Int. Cl. .....................................G09b 15/02, G10b 15/00
[58] Field of Search .................................84/470–474, 477, 84/478, 480, 482, 485

[56] References Cited

UNITED STATES PATENTS

| 2,332,842 | 10/1943 | Champion | 84/473 |
| 2,542,235 | 2/1951 | Clopton | 84/474 |
| 3,185,016 | 5/1965 | Stinson | 84/478 |
| 3,220,296 | 11/1965 | Giltzow | 84/480 |

FOREIGN PATENTS OR APPLICATIONS 717,683  11/1954  Great Britain..........................84/473

Primary Examiner—Richard B. Wilkinson
Assistant Examiner—John F. Gonzales
Attorney—Johnson & Kline

[57] ABSTRACT

A device for the automatic selection and display of chromatic seals notes and relative keyboard keys corresponding to any preselected major scale or type of chord and any preselected name of major scale or chord whereby the name and type of scale or chord, as well as roots and inversions thereof, can be dialed to identify the corresponding notes and keyboard keys, or, conversely, the desired range of notes and keyboard keys can be dialed to identify the name of the major scale and the name and type of chord, as well as roots and inversions, corresponding to those chromatic notes and keyboard keys.

8 Claims, 6 Drawing Figures

PATENTED JUL 18 1972 3,677,130
SHEET 1 OF 2
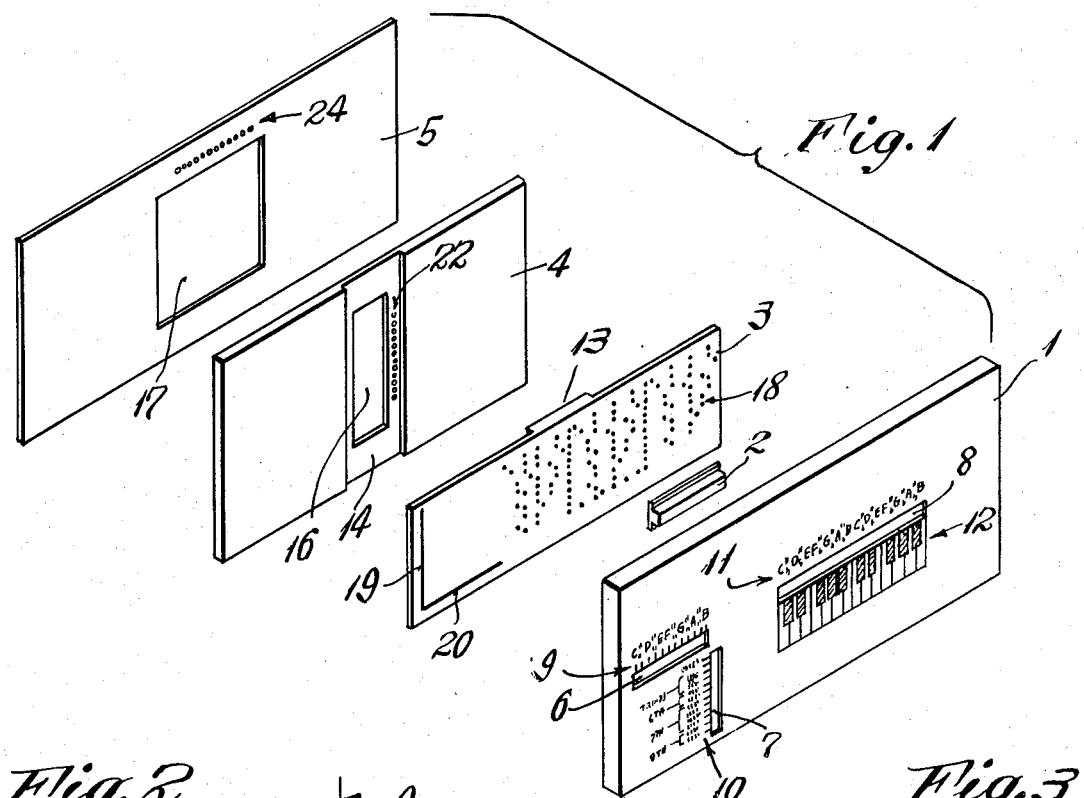
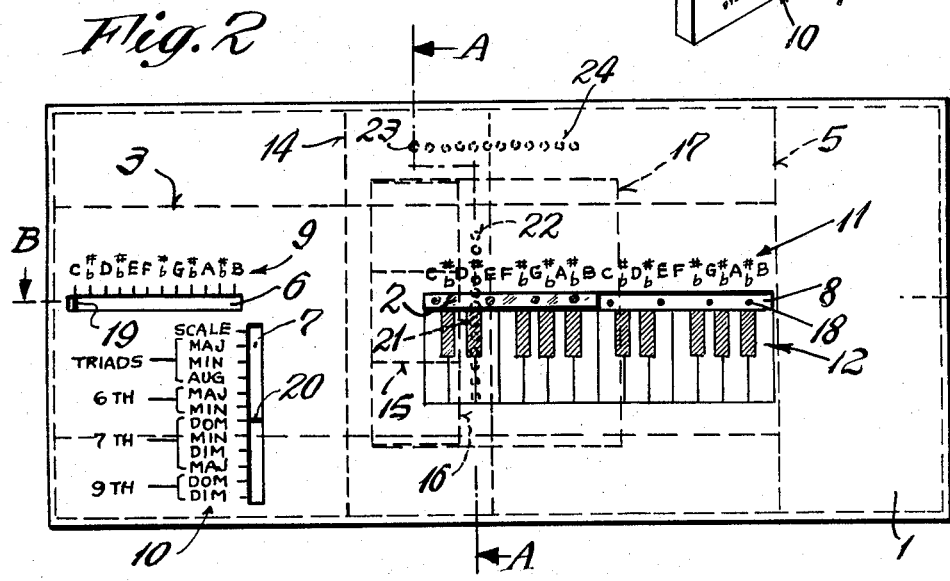
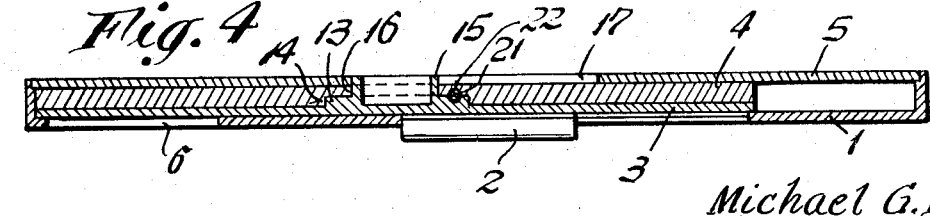
INVENTOR.
Michael G. Petreycik
BY
Johnson and Kline
ATTORNEYS

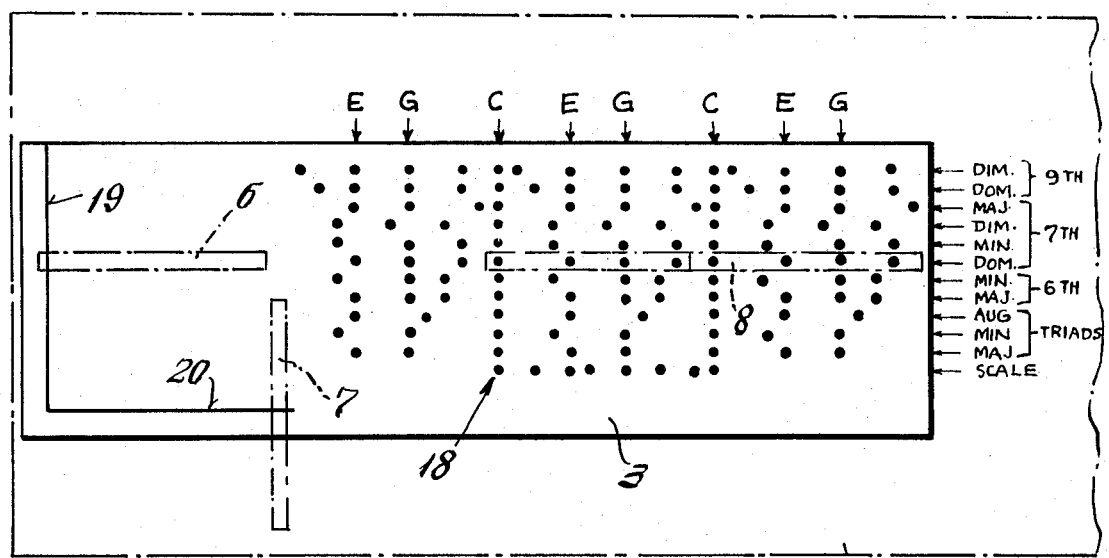

CHORD TEACHING DEVICE

Many devices have been proposed as teaching aids in connection with the playing of keyboard instruments, particularly piano. Most such devices are relatively large in size and adapted to be mounted on the instrument in registration with the keys thereof to indicate to the student the proper keys to operate corresponding to preselected major scales and chords which are dialed or otherwise programed on the device. Such devices are useful only in association with a keyboard instrument and only in association with such an instrument of standard size, excluding for instance children's size pianos and organs and accordians of all sizes.

Furthermore, these and other known teaching aids are complicated to program and/or provide only a limited amount of information to the student. Such devices generally provide a visual indication of the keyboard keys corresponding to the preselected name and type of major scale or chord but do not instruct the student regarding the root note of a preselected major scale or inversions of a preselected chord and/or do not enable the student to program the device within a preselected keyboard range.

An important disadvantage of many known so-called teaching aids for keyboard music is that such aids are so associated with the keyboard instrument and/or are so limited with respect to the information which they provide that they lead the student to become dependent thereon rather than functioning to assist the student to become independent thereof.

It is the principal object of the present invention to provide a simplified, compact visual aid device for the student or teacher of keyboard music whereby the name and type of scale or chord can be dialed in simple manner to identify the notes of the chromatic scale in registration with the corresponding keys of a keyboard instrument and to provide an octave range selector in association with the notes of the chromatic scale whereby the root position of chord displays and the inversions of chord displays can be visually segregated in a simple manner.

It is another object of the present invention to provide a visual aid device which enables the student or teacher of keyboard music to select a desired range on a keyboard instrument, dial the name and type of the desired scale or chord, and then adjust the octave range selector to correspond to the selected keyboard range and segregate the notes of the chromatic scale corresponding to the selected keyboard range.

These and other objects and advantages of the present invention will be apparent to those skilled in the art in the light of the present disclosure including the drawings, in which FIG. 1 is an exploded perspective view of a device according to the present invention.

FIG. 2 is a front view of the assembled device of FIG. 1.

FIG. 3 is a cross-section taken along the line A—A of FIG. 2.

FIG. 4 is a cross-section taken along the line B—B of FIG. 2.

FIG. 5 is a plan view of the indicator panel 3 illustrating its relative position in the device of FIG. 2, the outline and windows 6, 7 and 8 of the face panel 1 being shown in broken lines.

FIG. 6 is a table illustrating the progression of tones of the 12-tone chromatic scale corresponding to the major scale and types of chords.

The present invention relates to a simplified compact visual aid device for the student or teacher of keyboard music which is best described by reference to FIGS. 1 to 4 of the accompanying drawings. In general, the apparatus comprises a face panel 1, a range selector bar 2, an indicator panel 3, a slide panel 4 and a backing panel 5. The face panel 1, with suitably attached backing panel 5, provides a housing for the assembled indicator panel 3 and slide panel 4. The front of the case contains windows 6, 7 and 8. Imprinted above window 6 is a linear dial 9 with 12 increments identified by the notes "C" through "B" of the chromatic scale. Imprinted alongside window 7 is a vertical linear dial 10 with 12 increments identified by note progressions as shown in the figures. Imprinted above window 8 are the note names 11 of two octaves of the chromatic scale. Imprinted below window 8 and in line with the note names 11 is a keyboard 12 consisting of two octaves. The range selector 2 slides horizontally in window 8 of the case. The length of the range selector is designed to cover a complete octave. The surface of the range selector is a cylindrical segment and serves as a magnifier lens.

The indicator panel 3 and the slide panel 4 comprise a vertical and horizontal slide assembly. A tongue 13, of the indicator panel 3, is slidable in groove 14 of the slide panel 4. A knob 15 forms a part of the indicator panel 3. The knob 15 projects through slot 16 of the slide panel 4, and through the hole 17 of the backing panel 5. Imprinted on the face of indicator panel 3 is a coded system of dots 18, a vertical line indicator 19, and a horizontal line indicator 20, as shown in FIG. 5. The dot arrangement which covers three octaves is based on the numerical sequence shown in the table of FIG. 6. The dots 18 are spaced horizontally to be in line with the imprinted keyboard 12 and note names 11 and are viewable through window 8 and magnified through the range bar 2. The vertical line indicator 19 is designed to be in line with the corresponding note names of linear dial 9 and is viewable through window 6 throughout the slidable range. Each row of dots 18 is spaced according to the numerical sequence of the note progressions shown on vertical linear dial 10 with reference to the table of FIG. 6 and the spacing of keys on imprinted keyboard 12. The horizontal line indicator 20 is designed to be in line with the increments of vertical linear dial 10, and is viewable through window 7 throughout the slidable range. Suitable detent means are employed to ensure vertical and horizontal alignment of the indicator panel 3 and slide panel 4 with the increments of dials 9 and 10. As shown in FIG. 3, a ball 21 rides in back of the indicator panel 3 and locks in grooves 22 of the face of the slide panel 4 and a ball 23 rides in back of the slide panel 4 and locks in grooves 24 of the face of the backing panel 5.

In operation, the various displays of coded dots which appear in window 8 are controlled by maneuvering knob 15 which projects through the backing panel 5. Through knob 15 the indicator panel 3 and panel 4 are slidable horizontally as an assembly. Through knob 15 the indicator panel 3 is independently vertically slidable. Through windows 6 and 7, the position of line indicators 19 and 20 with respective dials 9 and 10 determine the display of dots 18 seen through window 8 and the range selector bar 2. The range selector bar 2 magnifies the dots within the desired octave or range directing the operator to corresponding keys of the keyboard instrument. As illustrated by FIG. 5, the indicator panel 3 is positioned to the center vertically and positioned to the left horizontally under the face panel 1 when the device is dialed to the C Dominant Seventh chord, as illustrated by FIG. 2. In this position, as set by the line indicators 19 and 20 in windows 6 and 7, the dots 18 which show through window 8 give the user a visual picture of the note names corresponding to this name and type of chord and the position of these notes relative to the keyboard.

A chord or scale is defined by its name and type. The name of a scale may be any one of the 12 tones of the chromatic scale as shown in linear dial 9. The type of scale the apparatus is designed to display is the major scale which is indicated by "scale" on linear dial 10. The name of a chord may be any one of the 12 tones of the chromatic scale as shown in linear dial 9. The types of chords the apparatus is designed to display are identified on linear dial 10. In respective order the chord types are: Major Triad, Minor Triad, Augmented Triad, Major Sixth, Minor Sixth, Dominant Seventh, Minor Seventh, Diminished Seventh, Major Seventh, Dominant Ninth, and Diminished Ninth.

In operation, the following displays of dots through the viewing window 8 may be obtained by performing the indicated procedures.

1. Major Scale Display
    Procedure

Through window 7, align line indicator 20 on "SCALE" of dial 10.

Through window 6, align line indicator 19 on desired name of dial 9.

Position range selector 2 over the first seven dots to magnify display of dots.

The eighth dot (one) which is an octave higher than the first tone is not magnified.

2. Chord Display — Root Position

Procedure

Through window 6, align line indicator 19 on desired name on dial 9.

Position left side of range selector bar 2 under desired name on dial 11 which is in line with corresponding key of imprinted keyboard 12.

Through window 7, align line indicator 20 with desired chord progression on dial 10.

The magnified display of dots seen through the range selector 2 appear above the imprinted keyboard 12 and below the corresponding name on dial 11.

3. Chord Inversions

Procedure

After selecting the chord name and type as indicated by line indicators 19 and 20, various chord inversions may be viewed by moving the range selector bar 2 throughout its slidable range.

4. Chord Display Within Predetermined Range

Procedure

Position range selector bar 2 above desired range on imprinted keyboard 12. Position line indicators 19 and 20 as desired on dials 9 and 10. The magnified dots seen through the range bar 2 appear above the keys on the imprinted keyboard 12 which characterize the chord.

To illustrate the general principles applied in this invention, attention is directed to FIG. 6 which shows in tabular form the progression of tones of the 12-tone chromatic scale. The tones are identified by their names. Reading from left to right, the first tone of a chromatic scale is the name of the scale. A chromatic scale consists of 12 different tones. A 13th tone, which is an octave higher in pitch than the first tone, completes the chromatic scale octave. Reading from top to bottom, the 12 chromatic scales are shown in ascending order. The tones in a chromatic scale are an even numerical progression. The chromatic scale is used as a reference in representing a major scale.

A major scale is represented by a definite succession of numbers of the 12-tone scale. The numbers 1, 3, 5, 6, 8, 10, 12 and 13 representing respective tones of the 12-tone scale characterize a major scale. Similar to the chromatic scale, the first tone of a major scale is the name of the scale. In the table of FIG. 6, the tones of any chromatic scale which fall in the major scale numbered columns represent the major scale. For example, the tones which characterize the C major scale are C, D, E, F, G, A, B and C.

In a similar manner, chords are represented by a definite succession of numbers of the 12-tone scale. With the 12-tone scale name as the first tone, respective tones of the 12-tone scale characterizing the type of chords, are extracted in respective order to form a chord in the root position, that is, the note name of the chord is the first note. For example, a major triad in the root position is characterized by tones 1, 5 and 8 of the chromatic scale. Therefore, a C major chord in the root position is characterized by the notes C, E and G.

In the foregoing, it is shown that numerical relationship exists between the chromatic scale and major scales, and between chromatic scale and chords. The present description shows the application of this principle in the design and construction of the novel teaching device of the present invention, which may be programed to display major scales, a full range of chords in the root position, or any inversion thereof on an imprinted copy of a keyboard.

It should be understood that the device illustrated by the drawings represents a preferred embodiment of the present invention, and that variations in structure will be obvious to those skilled in the art within the scope of the appended claims. The essential requirements are that there be a face panel corresponding to case 1 of FIG. 1 carrying a scale and chord name dial and window, a scale and chord type dial and window and a chromatic scale indicator and window in registration with a simulated keyboard consisting of at least two octaves; that there be an octave range selector bar slidable within the chromatic scale indicator window for segregating an octave of notes indicated through said window; and that there be an indicator panel associated with the face panel and adapted for horizontal and vertical movement relative to the face panel, the indicator panel having thereon a vertical line indicator adapted to be visible through the name or type window of the face panel, an associated horizontal line indicator adapted to be visible through the type or name window of the face panel, and associated parallel vertical and horizontal coded columns of dots covering at least three octaves based upon the numerical sequence of the chromatic scale as shown in FIG. 6 of the drawings.

In the device illustrated, the name dial 9 and window 6 are horizontal and are associated with vertical line indicator 19, whereas the type dial 10 and window 7 are vertical and are associated with horizontal line indicator 20. Obviously, the type dial 10 and window 7 can be expanded to include a minor scale and other chord progressions if desired. The device of the drawings illustrates the most common types of chords.

In the preferred device illustrated by the drawings, the octave range selector 2 has a cylindrical surface and serves to magnify the size of the dots 18 which show through the indicator window 8, thereby segregating those dots 18 which fall within a given octave or range corresponding to the length of the range selector. Since the surface of the indicator panel 3 is below the surface of the imprinted keyboard 12 and note names 11, the use of the magnifier in window 8 eliminates parallax in viewing the dots 18. The range selector bar need not be one which magnifies the size of the dots, however, since other means of visual segregation are also suitable such as through the use of a translucent colored range selector or one which merely provides a line indication of the length of a given octave or range.

Variations and modifications may be made within the scope of the claims and portions of the improvements may be used without others.

I claim:

1. A visual aid device for keyboard musical instruments comprising a face panel and an indicator panel associated with said face panel and adapted for horizontal and vertical movements relative to said face panel, said face panel being provided with a chord and scale name dial and window, a chord and scale type dial and window perpendicular to said name dial and window and a multi-octave horizontal chromatic scale dial and window having a simulated keyboard in registration therewith, said indicator panel being provided with a system of parallel vertical and horizontal columns of dots which are coded according to the numerical progression of the chromatic scale, each horizontal column of dots being adapted to be visible through the scale window of the face panel as a single horizontal column of dots representing a multi-octave numerical progression of notes when the indicator panel is moved vertically relative to the face panel, said indicator panel also being provided with a horizontal line indicator and a vertical line indicator which are positioned relative to said coded dots, relative to each other, and relative to the name dial and window and type dial and window of the face panel such that when one line indicator is moved to a desired position on the name dial, as viewed through the window panel thereof, and the other line indicator is moved to the desired position on the type dial, as viewed through the window thereof, the horizontal column of dots which becomes visible through said scale window will correspond to the correct numerical progression of notes for the dialed name and type of scale or chord.

2. A visual aid device according to claim 1 in which an octave range selector is provided in association with the said scale window and is adapted for horizontal movement across the width thereof, the selector having a width corresponding to a single octave on said multi-octave chromatic scale dial and functioning to visually segregate the dots showing through said scale window into octave groups.

3. A visual aid device according to claim 2 in which the octave range selector comprises a transparent element which magnifies the dots to cause their visual segregation.

4. A visual aid device according to claim 1 in which the scale and chord name dial and window are horizontal and the window is aligned with the said chromatic scale window.

5. A visual aid device according to claim 1 comprising a vertical slide panel associated with said indicator panel and adapted for horizontal movement therewith, relative to the face panel, said slide panel having guide means for supporting the indicator panel for vertical movement relative to said slide panel and to said face panel and for supporting the indicator panel for horizontal movement relative to said face panel.

6. A visual aid device according to claim 5 in which said guide means includes detent means for coordinating the vertical positioning of the indicator panel with the location of the chromatic scale window on the face panel.

7. A visual aid device according to claim 5 in which a backing panel is associated with said face panel to provide a case within which the indicator panel and slide panel are mounted for relative movement, the case limiting the slide panel to horizontal movement and the backing panel having detent means for coordinating the horizontal positioning of the slide panel and of the indicator panel supported thereon with the location of the chromatic scale window on the face panel.

8. A visual aid device according to claim 7 in which the slide panel and backing panel are provided with openings and the indicator panel is provided with means, accessible through said openings, by which the indicator panel can be moved vertically and horizontally within the case.

* * * * *